(12) United States Patent
Kim et al.

(10) Patent No.: US 10,908,461 B2
(45) Date of Patent: Feb. 2, 2021

(54) MANUFACTURING METHOD FOR DISPLAY DEVICE

(71) Applicant: SAMSUNG DISPLAY CO., LTD., Yongin-si (KR)

(72) Inventors: Hyoung-Joon Kim, Yongin-si (KR); Hyo Jin Kim, Yongin-si (KR); Kap Soo Yoon, Yongin-si (KR); Jeong Hyun Lee, Yongin-si (KR); Tae Hee Lee, Yongin-si (KR); So Young Jun, Yongin-si (KR); Soong Won Cho, Yongin-si (KR); Jeong Uk Heo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/515,472

(22) Filed: Jul. 18, 2019

(65) Prior Publication Data
US 2019/0377209 A1    Dec. 12, 2019

Related U.S. Application Data

(62) Division of application No. 15/259,127, filed on Sep. 8, 2016, now Pat. No. 10,394,086.

(30) Foreign Application Priority Data

Oct. 5, 2015   (KR) .......................... 10-2015-0139957

(51) Int. Cl.
*G02F 1/1339*   (2006.01)
*G02F 1/1335*   (2006.01)

(52) U.S. Cl.
CPC ........ *G02F 1/1339* (2013.01); *G02F 1/13394* (2013.01); *G02F 1/133512* (2013.01);
(Continued)

(58) Field of Classification Search
CPC ............. G02F 1/1339; G02F 1/133512; G02F 1/133514; G02F 1/133516; G02F 1/13394; G02F 2001/133519; G02F 2001/13398
See application file for complete search history.

(56) References Cited

U.S. PATENT DOCUMENTS 8,717,513 B2    5/2014  Park et al.
2008/0188157 A1*  8/2008  Tashiro ................. G02F 1/1303
                                                          445/25
(Continued)

FOREIGN PATENT DOCUMENTS

KR    10-2006-0033261 A    4/2006
KR    10-2007-0065065 A    6/2007
(Continued)

*Primary Examiner* — Nathanael R Briggs
(74) *Attorney, Agent, or Firm* — Kile Park Reed & Houtteman PLLC

(57) ABSTRACT

The exemplary embodiments relate generally to a display device that may include: a first substrate and a second substrate, each including a transparent encapsulation area; an outer sealant along a side of the transparent encapsulation area; a pattern part disposed on the first substrate and extending in a direction parallel to the outer sealant; and a transparent sealant adjacent to the pattern part and extending in a direction parallel to the pattern part, and a manufacturing method thereof.

14 Claims, 8 Drawing Sheets

(52) U.S. Cl.
CPC .. *G02F 1/133514* (2013.01); *G02F 1/133516* (2013.01); *G02F 2001/13398* (2013.01); *G02F 2001/133519* (2013.01)

(56) References Cited

U.S. PATENT DOCUMENTS

2009/0231527 A1    9/2009   Zhang et al.
2014/0300848 A1    10/2014   Mori
2015/0160497 A1    6/2015   Sonoda et al.

FOREIGN PATENT DOCUMENTS

| KR | 10-2013-0109709 A | 10/2013 |
| KR | 10-1382907 B1 | 4/2014 |
| KR | 10-1397443 B1 | 5/2014 |
| KR | 10-2014-0122907 A | 10/2014 |
| KR | 10-2014-0128595 A | 11/2014 |

\* cited by examiner

ND FOR DISPLAY
MANUFACTURING METHOD FOR DISPLAY DEVICE

CROSS-REFERENCE TO RELATED APPLICATIONS

This is a divisional application based on pending application Ser. No. 15/259,127, filed Sep. 8, 2016, the entire contents of which is hereby incorporated by reference.

Korean Patent Application No. 10-2015-0139957, filed on Oct. 5, 2015, in the Korean Intellectual Property Office, and entitled: "Display Device and Manufacturing Method Thereof," is incorporated by reference herein in its entirety.

BACKGROUND

1. Field

Example embodiments relate generally to a display device and a manufacturing method thereof.

2. Description of the Related Art

A liquid crystal display and an organic light emitting diode display may be representative of a flat panel display (FPD).

A display device may have a built-in camera for video chatting, video conferencing, etc.

SUMMARY

Exemplary embodiments provide a display device that may include: a first substrate and a second substrate, each including a transparent encapsulation area; an outer sealant along a side of the transparent encapsulation area; a pattern part disposed on the first substrate and extending in a direction parallel to the outer sealant; and a transparent sealant adjacent to the pattern part and extending in a direction parallel to the pattern part.

The first substrate may further include a light blocking member including an opening.

The transparent sealant may be formed to include an area corresponding to the opening.

The width of the transparent sealant may be larger than a diameter of the opening.

The first substrate may further include an overcoat layer on the light blocking member.

The pattern part may be on at least one of the overcoat layer and the light blocking member.

The pattern part may be on the overcoat layer and a height of the pattern part may be the same as that of the outer sealant.

The pattern part may be on the light blocking member and the pattern part may be a multi-layered structure.

The pattern part may be on the overcoat layer and the overcoat layer may be on the light blocking member, and the overcoat layer may include a recess portion with a shape that is depressed toward a side of the first substrate on an area corresponding to the opening.

The pattern part may be a same material as at least one of a color filter and a column spacer of the display device.

Exemplary embodiments also provide a method for manufacturing that may include: forming a pattern part extending in a direction along a side of a transparent encapsulation area of a first substrate or a second substrate; forming an outer sealant parallel to the pattern part; forming a transparent sealant adjacent to the pattern part and extending in a direction parallel to the pattern part; and sealing the first substrate and the second substrate, wherein forming the transparent sealant is performed such that the transparent sealant has a predetermined interval with the outer sealant and fills between the first substrate and the second substrate.

Forming the transparent sealant may be performed by a one-time process.

Forming the pattern part may be simultaneously performed with a step of forming a color filter in a display area of the first substrate that displays an image.

Forming the pattern part may be simultaneously performed with a step of forming a column spacer in a display area of the first substrate that displays an image.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
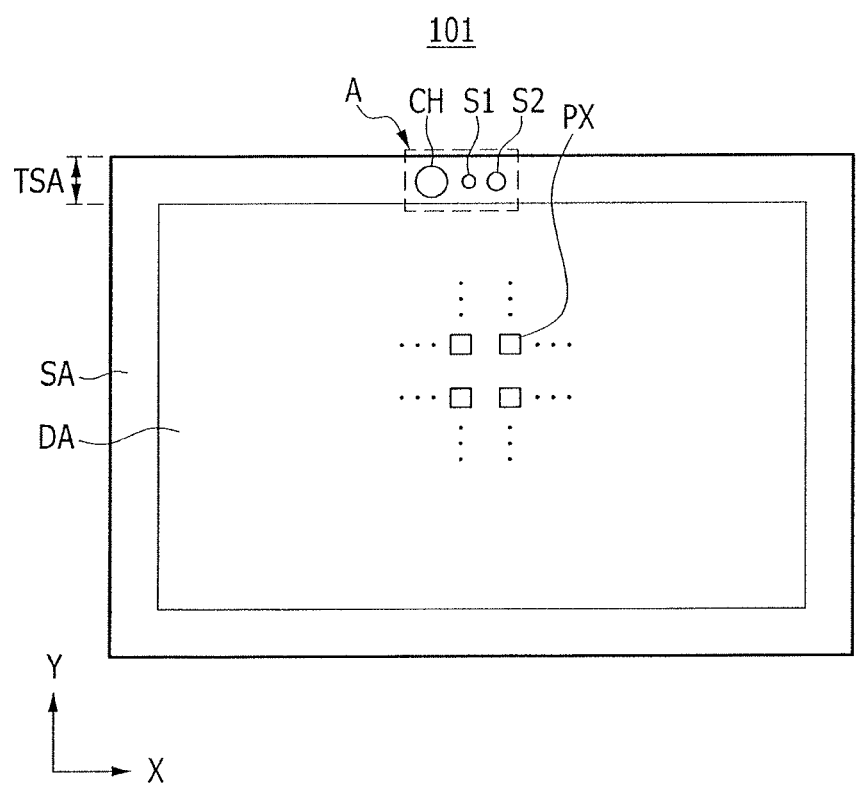
FIG. 1 illustrates a top plane view of a display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

Unless explicitly described to the contrary, the word "comprise" and variations such as "comprises" or "comprising" will be understood to imply the inclusion of stated elements but not the exclusion of any other elements. The size and thickness of each configuration shown in the drawings are arbitrarily shown for better understanding and ease of description, but the exemplary embodiments are not limited thereto. Like reference numerals refer to like elements throughout.

Figure 2:
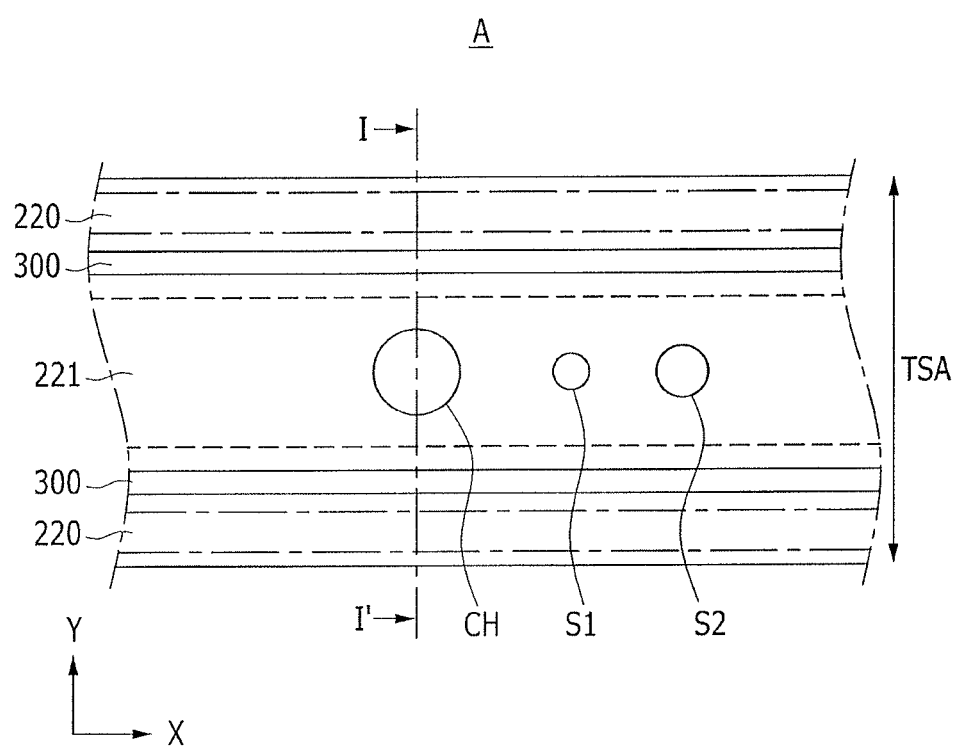
FIG. 2 illustrates a partial enlarged view of an area A of FIG. 1.
Figure 3:
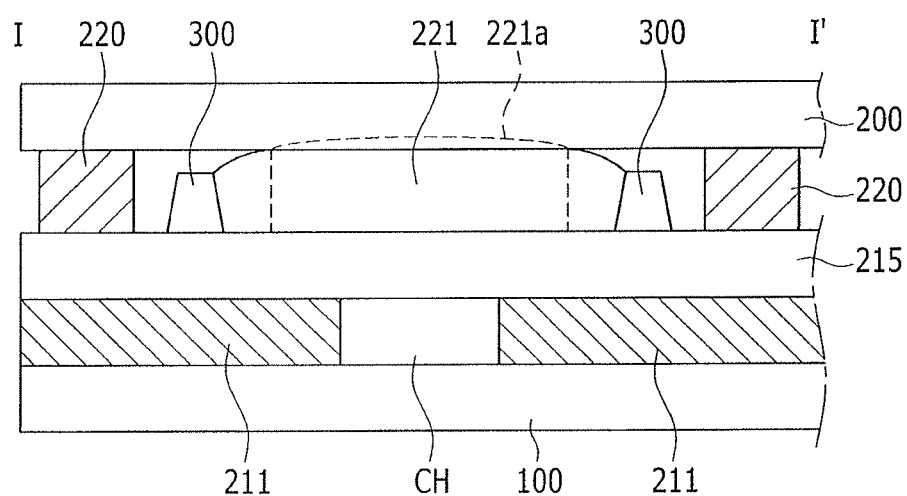
FIG. 3 illustrates a cross-sectional view taken along a line I-I' of FIG. 2.

FIG. 1 is a top plane view of a display device according to an exemplary embodiment, FIG. 2 is a partial enlarged view of an area A of FIG. 1, and FIG. 3 is a cross-sectional view taken along a line I-I' of FIG. 2.

Referring to FIG. 1 to FIG. 3, a display device 101 according to an exemplary embodiment may include a first substrate 100 and a second substrate 200 assembled with the first substrate 100 and positioned to face the first substrate 100 via a liquid crystal layer.

Here, the display device 101 may include a display area DA displaying the image and an encapsulation area SA enclosing the display area DA.

The display area DA may include a plurality of signal lines and a plurality of pixels PX connected thereto. The plurality of pixels PX may be arranged in an approximate matrix shape. Here, the pixel may include, for example, a unit area in which an image corresponding to one image signal is displayed, and a transmitting area in which light is actually transmitted or emitted and a light blocking area in which the light is blocked. In the light blocking area, an electric device such as a thin film transistor for applying a signal to the corresponding pixel PX or a black matrix, for example, may be positioned.

An outer sealant preventing the liquid crystal layer from being leaked and combining the first substrate 100 and the second substrate 200 may be formed along the edge of the encapsulation area SA in the encapsulation area SA.

Also, the encapsulation area SA may include a transparent encapsulation area TSA on one side thereof.

The transparent encapsulation area TSA may include an area in which the camera is mounted and a camera hole, i.e., opening CH, in which an external light is transmitted to flow into the camera lens. Also, several sensors S1 and S2 sensing optical signals other than the image signal may be positioned in an area neighboring the opening.

Referring to FIG. 2, the transparent encapsulation area TSA may include an outer sealant 220 sealing between the first substrate 100 and the second substrate 200 and formed along a long side of the transparent encapsulation area TSA (e.g., the x-axis direction in FIG. 2). The outer sealant 220, as shown in FIG. 2; may be formed in a pair along the long side of the transparent encapsulation area TSA with a predetermined interval.

In the exemplary embodiments, for convenience, a first substrate 100 and a second substrate 200 are indicated. The first substrate 100 may be an upper substrate and the second substrate 200 may be a lower substrate, for example, or the first substrate 100 may be the lower substrate and the second substrate 200 may be the upper substrate, for example.

Referring to FIG. 2, in the plane structure the display device according to an exemplary embodiment may include a pattern part 300 neighboring the outer sealant 220 and extending in a direction to be parallel to the outer sealant 220. In this case, the pattern part may also be formed in a pair with a predetermined interval between the pair of outer sealants 220.

Also, in the area neighboring the pattern part 300, a transparent sealant 221 may extend in a direction parallel to the pattern part 300.

In the plane structure, the transparent sealant 221 may cover all of the area in which the opening CH is formed. The transparent sealant 221 may have a wider width than a diameter of the opening CH.

Also, the transparent sealant 221 may be parallel to the outer sealant 220, and may be formed along the long side of the transparent encapsulation area TSA, like the outer sealant 220.

In the exemplary embodiments, because the transparent sealant 221 may be parallel to the outer sealant 220 and may extend in a direction at the position separated from both layers of the outer sealant 220, adherence between the first substrate 100 and the second substrate 200 may be further increased. Further, because the transparent sealant 221 may function to more solidly support the first substrate 100 and the second substrate 200 in the transparent encapsulation area TSA of the display device, warpage of the display panel caused by shrinkage of a film after adhering a polarization film and/or a protection film to the display device may be effectively suppressed.

Next, referring to FIG. 3, the display device according to an exemplary embodiment may include a light blocking member 211 positioned on the first substrate 100. The light blocking member 211 may be referred to as a black matrix and may function to cover a driver positioned in the encapsulation area SA or control lines connected to the driver such that they may not be recognized by the user. Here, the light blocking member 211 may include, for example, a pigment for light blocking such as carbon black, and may include a photosensitive organic material.

The light blocking member 211 may include the opening CH in which the external light is transmitted to flow to the camera lens. The opening CH may correspond to the diameter of the camera adhered to the display device.

In this case, the transparent sealant 221 may include all of the opening CH, for example, may have a width wider than the diameter of the camera.

Next, an overcoat layer 215 for the planarization of the first substrate 100 may be formed on the light blocking member 211.

The thickness of the overcoat layer 215 may be substantially equal to or thicker than the thickness of the light blocking member 211 including the opening CH. Also, the overcoat layer 215 may include the transparent organic material, and a viscosity thereof may be appropriately controlled such that the planarization of the first substrate 100 is controlled. The overcoat layer 215 may include an organic material of a high planarization effect having sufficient viscosity.

Meanwhile, in the display device according to an exemplary embodiment, the pattern part 300 may be on at least one of the light blocking member 211 and the overcoat layer 215 on the first substrate 100.

For example, the pattern part 300, as shown in FIG. 3, may be positioned close to the outer sealant 220 on the overcoat layer 215 with a predetermined interval. However the pattern part 300 may be disposed such that it does not overlap the opening CH.

Since the pattern part 300 may be on the overcoat layer 215, the transparent sealant 221a is spread to the pattern part 300 and the transparent sealant 221 may be close thereto, spreading the transparent sealant 221 to the outer sealant 220 and causing an encapsulation defect due to the reduction of the width or the thickness of the outer sealant may be prevented. For example, when combining the first substrate 100 and the second substrate 200, the transparent sealant 221 may be spread to the outer sealant 220, and generation of the defect of the liquid crystal not being completely enclosed and sealed due to the reduction of the width of the outer sealant 220 may be almost completely prevented. Also, although the amount of the transparent sealant 221a is not minutely controlled, since the amount that is capable of being appropriately spread close to the pattern part 300 is supplied, generation of a bubble within the transparent sealant 221 may be prevented, while all of the opening CH of the light blocking member 211 may be covered.

FIG. 4 to FIG. 7 are cross-sectional views taken along a line I-I' of FIG. 2, as exemplary variations of the exemplary embodiments.

Figure 4:
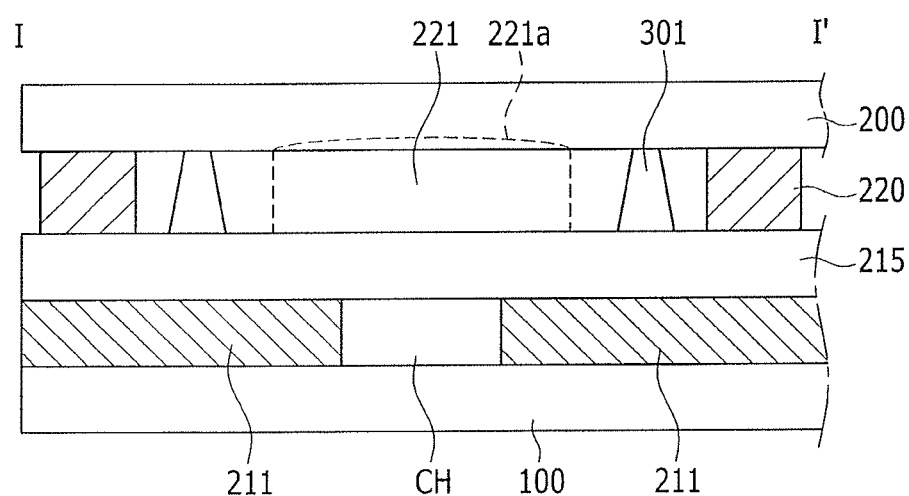
FIG. 4 to FIG. 7 illustrate cross-sectional views taken along a line I-I' of FIG. 2, as exemplary variations of the exemplary embodiments.

In an exemplary embodiment, a pattern part 301 formed on the overcoat layer 215, as shown in FIG. 4, may be the same height as the outer sealant 220. As described above, if the pattern part 301 has the same height as the outer sealant 220, although the amount of the transparent sealant 221 is not finely controlled, filling of the transparent sealant 221 between the first substrate 100 and the second substrate 200 and between the pattern parts 301 may be facilitated. Also, while the transparent sealant 221 may be prevented from being spread to the outskirts of the transparent encapsulation area TSA, the transparent sealant 221 extending along a direction including the area corresponding to the opening CH in the light blocking member 211 may be intensively formed such that a generation ratio of the bubbles may be remarkably reduced.

Figure 5:
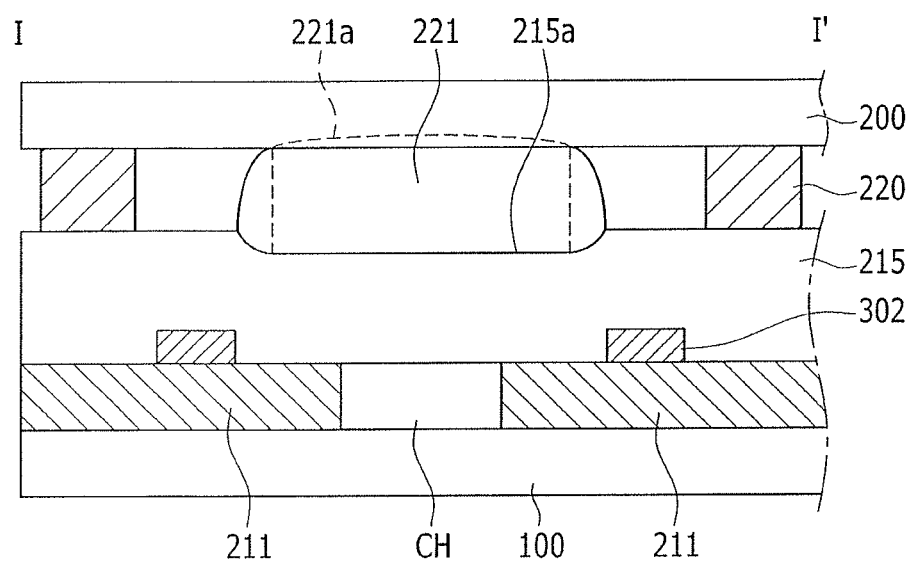

Additionally, a pattern part 302, as shown in FIG. 5, may be disposed such that it does not overlap the opening CH on the light blocking member 211 having the opening CH. In this case, as shown in FIG. 5, the pattern parts 302 may be a single layer, while as shown in FIG. 6, pattern parts 303 may be multi-layer.

When the pattern parts 302 and 303 are formed on the light blocking member 211 and the overcoat layer 215 is coated thereon, the area corresponding to the opening CH of the overcoat layer 215 may include a recess portion 215a having a depressed shape to the side of the first substrate 100 due to the step generated by the pattern parts 302 and 303.

When forming the transparent sealant 221 within the recess portion 215a, since the transparent sealant 221 is naturally focused on the depressed area, spreading of the transparent sealant 221 may be prevented such that the thickness of the transparent sealant 221 is decreased, thereby preventing generation of a bubble in the transparent sealant 221.

Figure 6:
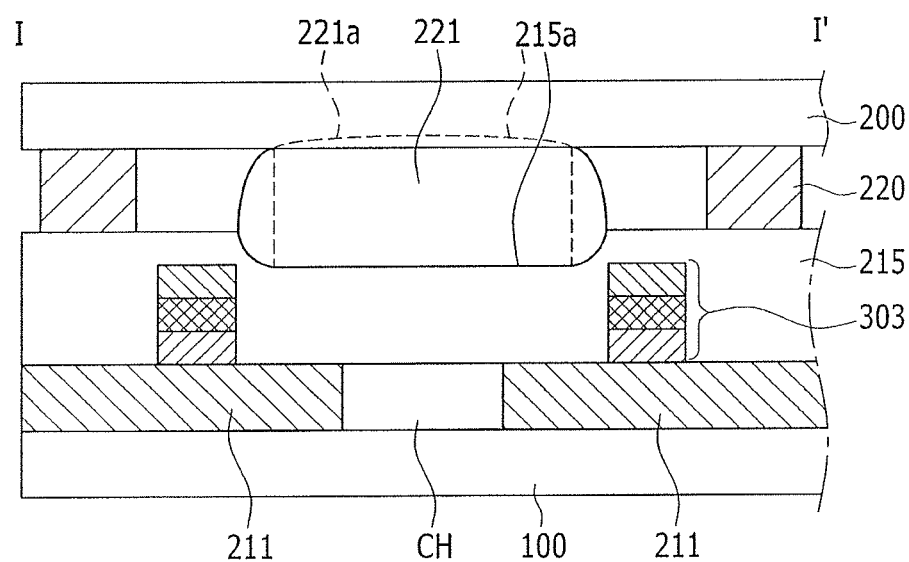

In the pattern part 300, the vertical cross-sectional shape of the direction crossing the long side of the transparent encapsulation area TSA may be, for example, a trapezoid shape as shown in FIG. 3 and FIG. 4, or a rectangle shape as shown in FIG. 5 and FIG. 6, and it may be at least one of a square, a semicircle, and a semi-ellipse.

Figure 7:
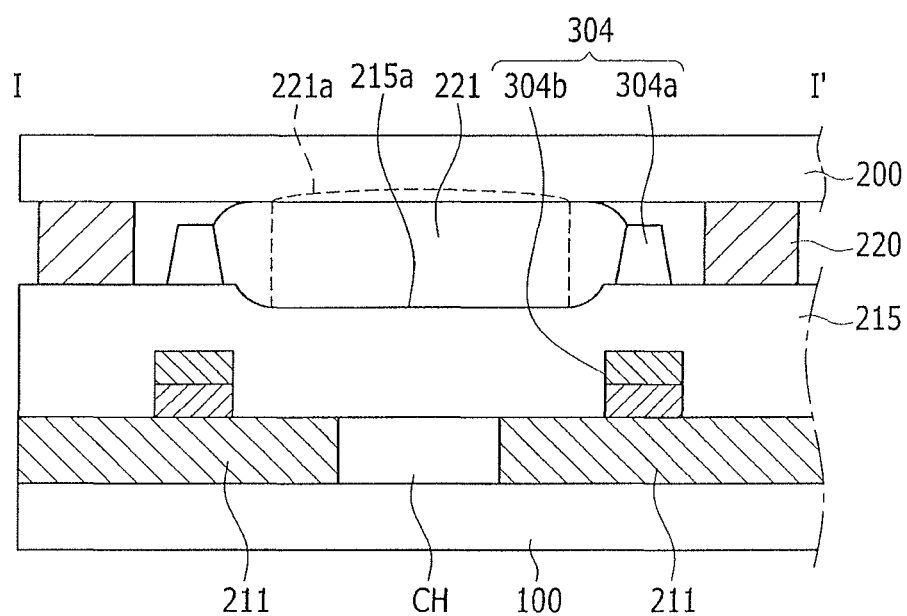

A pattern part 304, as shown in FIG. 7, may be simultaneously formed on the light blocking member 211 and the overcoat layer 215. In this case, the area corresponding to the opening CH of the overcoat layer 215 may include the recess portion 215a at the side of the first substrate 100 due to the step generated by a pattern part 304b formed on the light blocking member 211. Also, since a pattern part 304a may also be formed on the overcoat layer 215, the process forming the transparent sealant 221 may be further facilitated. This is because the transparent sealant 221 may not spread to the outer area of the transparent encapsulation area TSA and may be concentrated on the area corresponding to the opening CH within the outer sealant 220.

The pattern part may be formed of a same material as at least one of the materials of a color filter and a column spacer on the display area DA of the first substrate 100. In detail, when forming the pattern part 300 by using the material forming the color filter, the pattern part 300 may be positioned on the light blocking member 211. When forming the pattern part 300 by using the material forming the column spacer, the pattern part 300 may be positioned on the overcoat layer 215. However, the pattern part 300 is not limited thereto.

In addition, the color filter may include a red color filter, a green color filter, and a blue color filter, for example. Here, for convenience, the red color filter, the green color filter, and the blue color filter are described as the only color filters provided, but a color filter having a different color may be included. In the display device, the color filter formed in the display area DA may be arranged to correspond to the area of each pixel PX, thereby displaying the corresponding color.

Also, the interval of the liquid crystal layer between the first substrate 100 and the second substrate 200 is referred to as a cell gap, and the cell gap may affect the overall operation characteristics of the display device, such as response speed, contrast ratio, viewing angle, and luminance uniformity. If the cell gap is not uniform, a uniform image may not be displayed throughout the screen such that the display quality deterioration may occur. Accordingly, the column spacer is generally formed on one of two substrates to maintain a uniform cell gap throughout the entire area on the substrate of the display device. In the exemplary embodiments, the column spacer, as described above, means the spacer formed on the display area DA to maintain the uniform cell gap.

As described above, the display device according to the exemplary embodiments may include the pattern part 300 extending in a direction parallel to the outer sealant 220 on the transparent encapsulation area TSA of the first substrate 100 and the transparent sealant 221 extending in a direction parallel to the pattern part 300 and close to the pattern part 300. Thus, an empty space of a vacuum state may be prevented from forming between the first substrate 100 and the second substrate 200.

Accordingly, the diffraction pattern of concentric circles may be prevented on the image photographed by using the camera mounted on the display device. Also, since the transparent sealant 221 is concentrated having a width that may be larger than a width of the area corresponding to the opening CH to allow the external light to flow into the camera lens, a bubble in the transparent sealant 221 may be prevented such that the image quality of the camera mounted on the display device may be remarkably improved.

Figure 8:
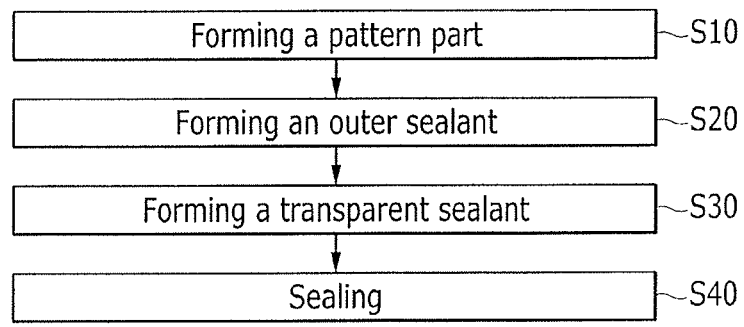
FIG. 8 illustrates a process flowchart of a manufacturing method of a display device according to an exemplary embodiment.

FIG. 8 is a process flowchart showing a manufacturing method of a display device according to an exemplary embodiment.

Referring to FIG. 8, the manufacturing method of the display device may include a step of forming a pattern part 300 (S10), a step of forming an outer sealant 220 (S20), a step of forming the transparent sealant 221 (S30), and a sealing step (S40). In the manufacturing method of the display device according to the exemplary embodiments, the order of the steps is not limited and may be changed.

First, the step (S10) of forming the pattern part 300, in the plane structure as shown in FIG. 2, is performed to extend the pattern part 300 in a direction along the long side of the transparent encapsulation area TSA on the prepared first substrate 100 or second substrate 200.

In this case, the first substrate 100 or the second substrate 200 may include the insulating material such as glass or plastic, for example.

In the manufacturing method of the display device according to an exemplary embodiment, the step (S10) of forming the pattern part 300 may be simultaneously performed with a step of forming a color filter on the display area DA of the first substrate 100.

The step of forming the color filter may be performed by using a photolithography process, or an inkjet method, for example. Accordingly, in the process of forming the color filter in the display area DA, after patterning the pattern part 300 on the transparent encapsulation area TSA, the color filter may be formed on the transparent encapsulation area TSA by using the photolithography process or the inkjet printing process.

As described above, the pattern part 300 on the transparent encapsulation area TSA may be simultaneously formed with the step of forming the color filter on the light blocking member 211, and they may be formed of a single layer and/or a multi-layer.

In this case, since a step is generated on the overcoat layer 215 due to the pattern part 300 being formed on the light blocking member 211, the recess portion 215a of the first substrate 100 may be formed on the area corresponding to the opening CH in the light blocking member 211.

On the other hand, in the manufacturing method of the display device according to another exemplary embodiment, the step S10 of forming the pattern part 300 may be simultaneously performed with a step of forming a column spacer on the display area DA of the first substrate 100.

The step of forming the column spacer may be performed by using the photolithography process, for example. Accordingly, after coating the material for forming the column spacer on the display area DA and the transparent encapsulation area TSA, the pattern part 300 may be formed on the transparent encapsulation area TSA by a method of light irradiation and etching, for example, by using a mask patterned with the pattern part 300 be formed on the area corresponding to the transparent encapsulation area TSA.

Here, the material for forming the column spacer may be, for example, a black-based material, and the black-based material may be a material including at least one of carbon black, an organic pigment, an inorganic pigment, and an RGB mixture pigment.

As described above, the pattern part 300 of the transparent encapsulation area TSA that is simultaneously formed with the step of forming the column spacer may be formed on the overcoat layer 215. In this case, the pattern part 300 may be formed, as described above, with a same height as the outer sealant 220 and may be lower than the outer sealant 220, but it is not specifically limited thereto.

As described above, in the manufacturing method of the display device according to the exemplary embodiments, a separate process to form the pattern part 300 on the transparent encapsulation area TSA is not required. Further, the process of forming the color filter and the column spacer on the display area DA and a method of adding the desired pattern may be performed on the transparent encapsulation area TSA, thereby simplifying the manufacturing process.

Next, the step (S20) of forming the outer sealant 220 may be performed by coating the material for forming the outer sealant 220. The outer sealant 220 may extend in a direction to be parallel to the pattern part 300 and be separated with a predetermined interval.

In this case, the outer sealant 220 may be formed, for example, of a polymer mixture mixed with an epoxy resin and a curing accelerator, and may be transparent. Also, the outer sealant 220 may be hardened by heating and/or UV irradiation, for example, and, thereby, serve as an adhesive maintaining the combination state of the first substrate 100 and the second substrate 200.

Next, the step (S30) of forming the transparent sealant 221 may be performed such that the transparent sealant 221 may be close to the pattern part 300 and may extend in a direction to be parallel to the pattern part 300.

The step of forming the transparent sealant 221 may be formed by a one-time process, for example, a drawing process.

In this case, the transparent sealant 221 may be formed of the polymer mixture mixed with the epoxy resin and the curing accelerator, and may be hardened by the heating and/or the UV irradiation. Additives of the transparent sealant 221 may be added to appropriately control the viscosity.

Accordingly, the formed sealant 221 may be naturally spread to the side of the pattern part 300 and formed to meet the first substrate 100 and the second substrate 200 while meeting the pattern part 300 and fully filling the recess portion 215a formed in the overcoat layer 215.

In detail, the transparent sealant 221 may be formed on the pattern part 300 formed on the overcoat layer 215 and in the recess portion 215a on the overcoat layer 215 formed by the pattern part 300 formed on the light blocking member 211, while the transparent sealant 221 is appropriately spread.

Accordingly, since the insertion amount of the transparent sealant 221 is not minutely controlled and the appropriate amount thereof is supplied, the process characteristic may become excellent. Also, since the area corresponding to the opening CH may be completely covered by only a one-time process by supplying the appropriate amount, as in the conventional art, for example, the drawing process covering all of the opening does not need to be repeatedly performed. Resultantly, since formation of a bubble in the transparent sealant 221 may be almost completely prevented, the generation ratio of the bubbles may be remarkably reduced. Also, a defect rate caused by the transparent sealant 221 that is spread to the side of the outer sealant 220 may be remarkably reduced.

Next, the sealing step (S40) is performed. The first substrate 100 and the second substrate 200 may be disposed to face each other. The outer sealant 220 and the transparent sealant may be hardened through the heating and/or the UV light irradiation, for example, thereby sealing the first substrate 100 and the second substrate 200 and manufacturing the display device.

According to the manufacturing method of the display device according to the exemplary embodiments, the pattern part 300 may be easily formed in the transparent encapsulation area TSA without a separate process. Further, the transparent sealant 221 may be easily and accurately formed to be close to the pattern part 300 and to extend in a direction parallel to the pattern part 300 by only a one-time process. Since the transparent sealant 221 without a bubble may be formed at the position corresponding to the opening CH, the display device having the excellent camera image quality may be manufactured.

By way of summation and review, exemplary embodiments provide a display device that may have improved camera image quality.

In general, an extra space is required in a display panel to build a camera into the display device. This arrangement does not serve to minimize a bezel area on the periphery of the display panel. To overcome this problem, a black matrix having an opening may be formed on one of an upper substrate or a lower substrate of the display panel, and the camera may be mounted on the other of the upper substrate or the lower substrate corresponding to the opening.

However, in this case, an empty space of a vacuum state is formed between the black matrix near the opening and the facing substrate. In general, by diffraction of light passing through the substrate made of glass and the camera lens, a diffraction pattern of concentric circles is generated on the image photographed with the camera.

In order to improve this, filling the empty spaces with a transparent sealant has been attempted, but in the process of filling the transparent sealant, a minute bubble is formed in the transparent sealant such that the image quality of the camera is deteriorated.

To overcome this problem, by extending a pattern part in a direction to be parallel to an outer sealant sealing the upper and lower substrates on a transparent encapsulation area of the substrate in which a camera hole is positioned, and by extending a transparent sealant in a direction to be parallel to the pattern part on the area corresponding to the camera hole, the above-described problem may be overcome and the camera image quality of the display device may be improved.

The display device according to exemplary embodiments may prevent a bubble from being generated in the transparent sealant formed on the transparent encapsulation area such that the diffraction pattern may be prevented in the image photographed by the built-in camera of the display device, thereby remarkably improving the camera image quality of the display device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method for manufacturing a display device, the method comprising:
    forming a pattern part outside a display area of the display device, the pattern part extending in a direction along a side of a transparent encapsulation area of a first substrate or a second substrate;
    forming an outer sealant parallel to the pattern part after forming the pattern part, the outer sealant being on a first side of the pattern part;
    forming a transparent sealant adjacent to the pattern part after forming the pattern part, the transparent sealant being on a second side of the pattern part opposite the first side and extending in a direction parallel to the pattern part such that the transparent sealant has a predetermined interval with the outer sealant and fills between the first substrate and the second substrate; and
    sealing the first substrate and the second substrate.

2. The method as claimed in claim 1, wherein forming the transparent sealant is performed by a one-time process.

3. The method as claimed in claim 1, wherein forming the pattern part is simultaneously performed with a step of forming a color filter in a display area of the first substrate that displays an image.

4. The method as claimed in claim 1, wherein forming the pattern part is simultaneously performed with a step of forming a column spacer in a display area of the first substrate that displays an image.

5. The method as claimed in claim 1, wherein sealing the first substrate and the second substrate includes:
    disposing the first substrate and the second substrate so as to face each other; and
    hardening the outer sealant and the transparent sealant through at least one of heating and ultraviolet (UV) light irradiation.

6. The method as claimed in claim 1, wherein
    the first substrate further includes a light blocking member including an opening, and
    the transparent sealant includes an area overlapping the opening.

7. The method as claimed in claim 6, wherein the transparent sealant includes an area completely overlapping the opening.

8. The method as claimed in claim 6, wherein a width of the transparent sealant is larger than a diameter of the opening.

9. The method as claimed in claim 1, wherein:
    the pattern part includes first and second pattern parts, the transparent sealant extending between the first and second pattern parts,
    the outer sealant includes first and second outer sealants,
    the first pattern part is between the transparent sealant and the first outer sealant, and
    the second pattern part is between the transparent sealant and the second outer sealant.

10. The method as claimed in claim 9, wherein the transparent sealant is in direct contact with each of the first and second pattern parts.

11. A method for manufacturing a display device, the method comprising:
    forming a pattern part extending in a direction along a side of a transparent encapsulation area of a first substrate or a second substrate, the first substrate including a light blocking member including an opening;
    forming an outer sealant parallel to the pattern part;
    forming a transparent sealant adjacent to the pattern part and extending in a direction parallel to the pattern part such that the transparent sealant has a predetermined interval with the outer sealant and fills between the first substrate and the second substrate; and
    sealing the first substrate and the second substrate, wherein
    the pattern part separates the transparent sealant from the outer sealant.

12. The method as claimed in claim 11, wherein sealing the first substrate and the second substrate includes:
    disposing the first substrate and the second substrate so as to face each other; and
    hardening the outer sealant and the transparent sealant through at least one of heating and ultraviolet (UV) light irradiation.

13. The method as claimed in claim 11, wherein the transparent sealant has a predetermined interval with respect to the outer sealant.

14. The method as claimed in claim 11, further comprising forming an overcoat layer on the light blocking member such that the overcoat layer is between the light blocking layer and the transparent sealant.

* * * * *